(12) United States Patent
Rubio et al.

(10) Patent No.: US 12,384,134 B2
(45) Date of Patent: Aug. 12, 2025

(54) COATED MULTILAYER METAL COOKING VESSEL THAT CAN BE HEATED BY INDUCTION

(71) Applicant: SEB S.A., Ecully (FR)

(72) Inventors: Martin Rubio, Rumilly (FR); Jean-Francois Brasset, Annecy (FR)

(73) Assignee: SEB S.A. (FR)

( * ) Notice: Subject to any disclaimer, the term of this patent is extended or adjusted under 35 U.S.C. 154(b) by 352 days.

(21) Appl. No.: 17/789,395

(22) PCT Filed: Dec. 22, 2020

(86) PCT No.: PCT/EP2020/087713
§ 371 (c)(1),
(2) Date: Jun. 27, 2022

(87) PCT Pub. No.: WO2021/130279
PCT Pub. Date: Jul. 1, 2021

(65) Prior Publication Data
US 2023/0049608 A1 Feb. 16, 2023

(30) Foreign Application Priority Data

Dec. 27, 2019 (FR) ..................... 1915687

(51) Int. Cl.
*B32B 15/01* (2006.01)
*A47J 36/02* (2006.01)
*B32B 37/10* (2006.01)

(52) U.S. Cl.
CPC ............ *B32B 15/012* (2013.01); *A47J 36/02* (2013.01); *B32B 37/10* (2013.01);
(Continued)

(58) Field of Classification Search
None
See application file for complete search history.

(56) References Cited

U.S. PATENT DOCUMENTS 10,258,192 B1 * 4/2019 Cloutier ................. A47J 36/16
2007/0292706 A1   12/2007 Spring et al.
(Continued)

FOREIGN PATENT DOCUMENTS

CN     103462513 A  * 12/2013  ............. A47J 36/02
CN     109097717 A  * 12/2018  ............ A47J 27/002
(Continued)

OTHER PUBLICATIONS

Huang—CN 103462513 A—CN Rej. D1—MT—cookware—2013 (Year: 2013).*
(Continued)

*Primary Examiner* — Xiaobei Wang
(74) *Attorney, Agent, or Firm* — Lerner David LLP

(57) ABSTRACT

The invention relates to a coated multilayer metal cooking vessel compatible with induction heating, comprising a metal body having a heating face bearing a protective coating and a cooking face bearing a non-stick coating forming a cooking surface.

According to the invention, the metal body comprises an aluminum sheet which is metallurgically bonded to a double-faced aluminized low-carbon ferromagnetic steel sheet forming the heating face, the double-faced aluminized low-carbon ferromagnetic steel sheet comprising a low-carbon ferromagnetic steel substrate having on each of its two faces an outer layer comprising an aluminum-based matrix, an intermediate layer comprising iron/aluminum intermetallic compounds which are arranged between the low-carbon ferromagnetic steel substrate and the outer layer, and, at least on the bottom of the heating face, the outer layer has a thickness of less than 27 μm, preferably less than 20 μm, and more preferably less than 18 μm.

(Continued)

The invention also relates to a cookware article, an electrical cooking appliance and a method for obtaining a coated metal cooking vessel.

25 Claims, 7 Drawing Sheets

(52) U.S. Cl.
CPC ....... *B32B 2255/06* (2013.01); *B32B 2255/26* (2013.01); *B32B 2307/202* (2013.01); *B32B 2307/302* (2013.01); *B32B 2307/308* (2013.01); *B32B 2307/746* (2013.01)

(56) References Cited

U.S. PATENT DOCUMENTS

| | | | | |
|---|---|---|---|---|
| 2015/0083711 A1* | 3/2015 | Moon | ............... | A47J 36/02 29/602.1 |
| 2019/0360700 A1* | 11/2019 | Michel | ............... | B32B 15/00 |
| 2019/0381764 A1* | 12/2019 | Kang | ............... | C23C 2/16 |

FOREIGN PATENT DOCUMENTS

| | | | | |
|---|---|---|---|---|
| EP | 2554080 A1 | 2/2013 | | |
| FR | 3070245 A1 | 3/2019 | | |
| WO | 2011073577 A2 | 6/2011 | | |
| WO | WO-2018117716 A1 * | 6/2018 | ........... | B32B 15/012 |
| WO | WO-2019038498 A1 * | 2/2019 | ............. | A47J 36/02 |

OTHER PUBLICATIONS

Reliance Foundry, "Is Carbon Steel better than Mild Steel?", <https://reliance-foundry.com/blog/carbon-steel-mild-steel>, accessed Nov. 1, 2023. (Year: 2023).*
Lemmens et al., "Effect of silicon on the microstructure and growth kinetics of intermetallic phases formed during hot-dip aluminizing of ferritic steel", Nov. 2017, Surface & Coating Tech., vol. 319, pp. 104-109. (Year: 2017).*
Gupta, "Intermetallic compounds formation in Fe—Al—Si ternary system: Part I", 2003, Materials Characterization, vol. 49, pp. 269-291. (Year: 2003).*
Gupta et al., "Intermetallic compounds formation in Fe—Al—Si ternary system: Part II", 2003, Materials Characterization, vol. 49, pp. 293-311. (Year: 2003).*
International Search Report for Application No. PCT/EP2020/087713 mailed Feb. 1, 2021, pp. 1-3.

* cited by examiner

[Fig 1]
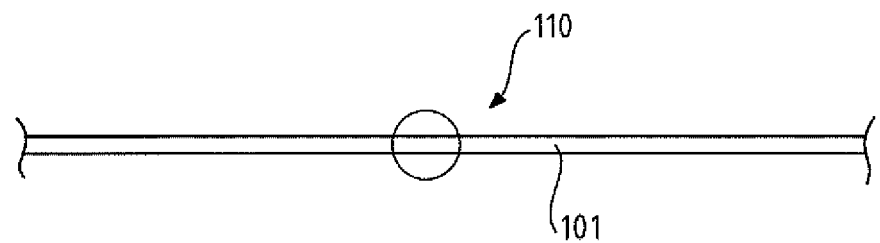
[Fig 2]
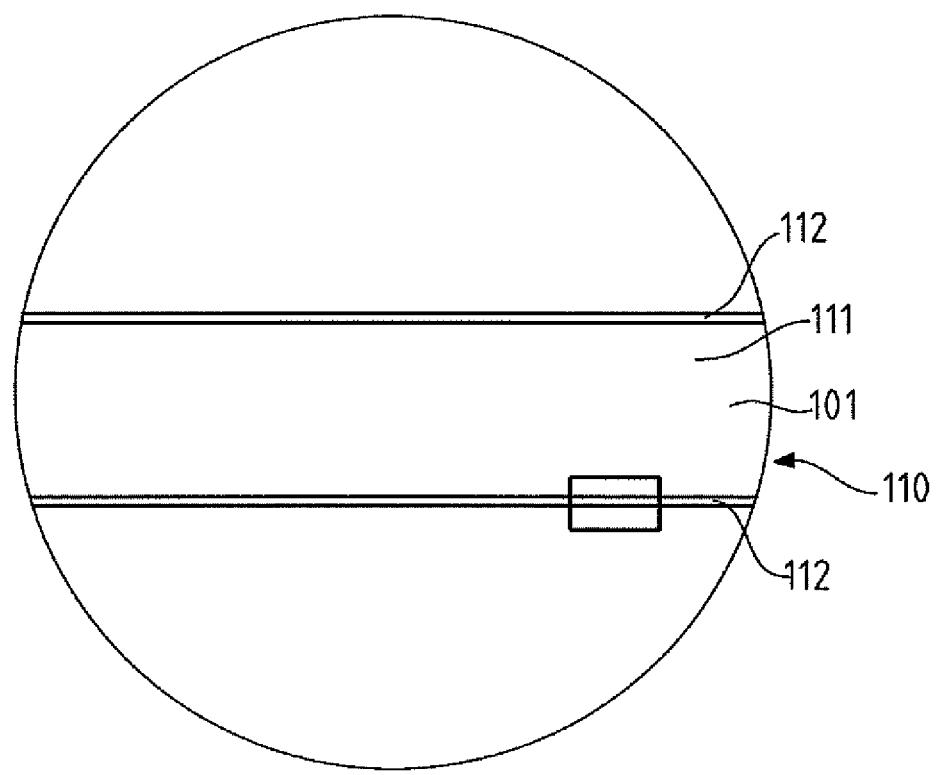

[Fig 3]
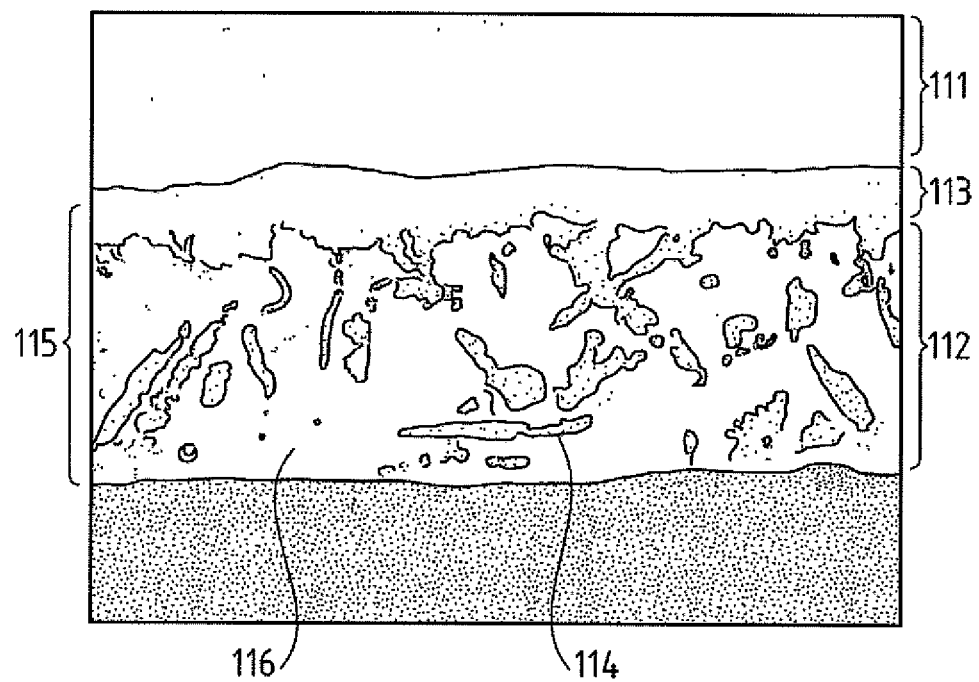

[Fig 4]
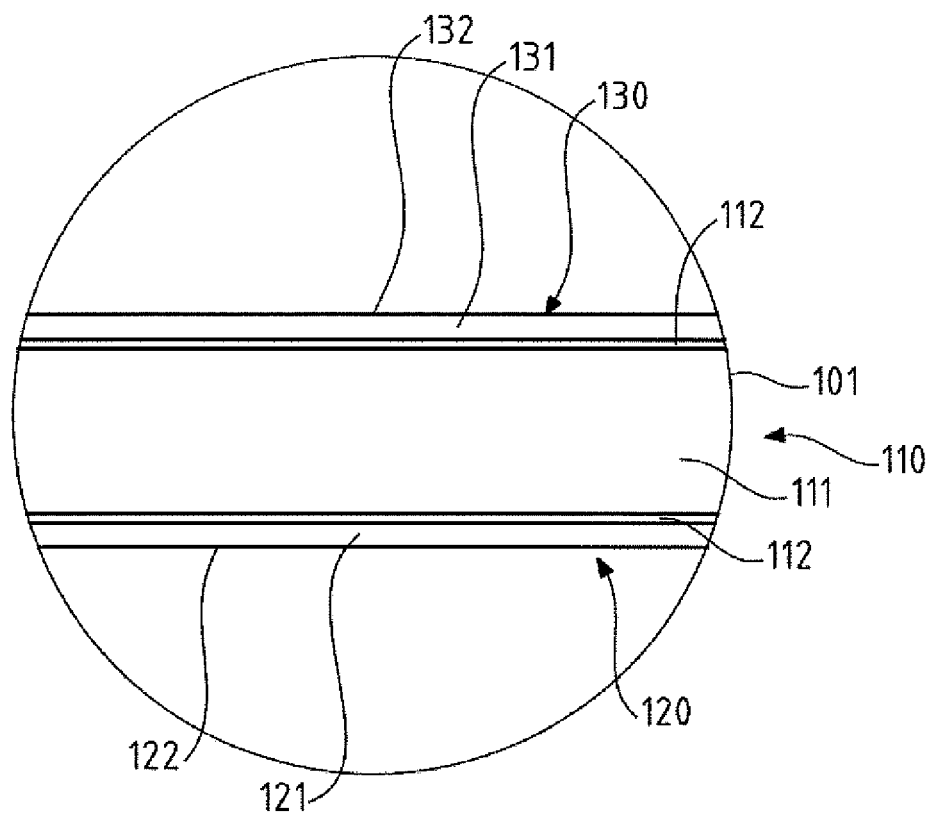
[Fig 5]
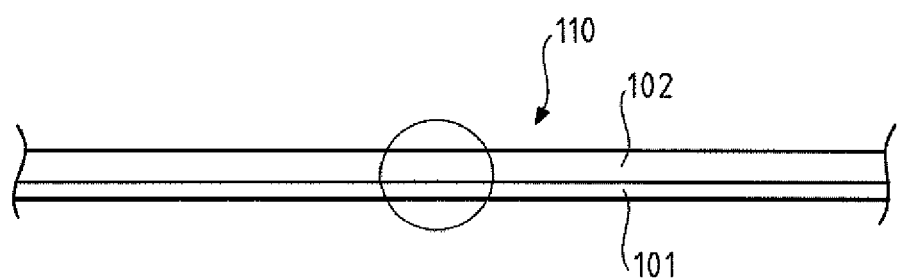

[Fig 6]
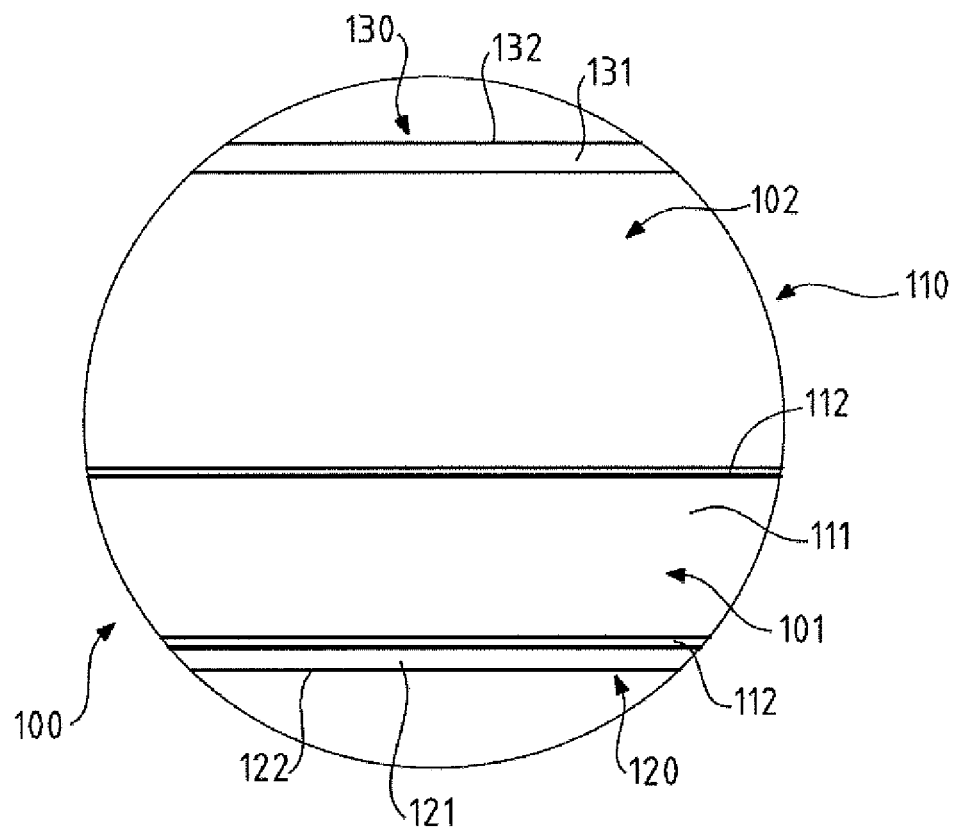
[Fig 7]
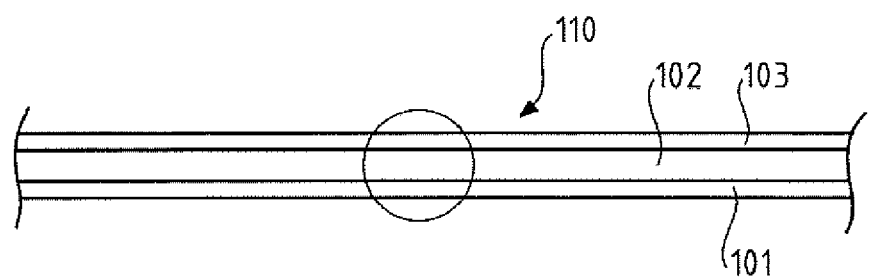

[Fig 8]
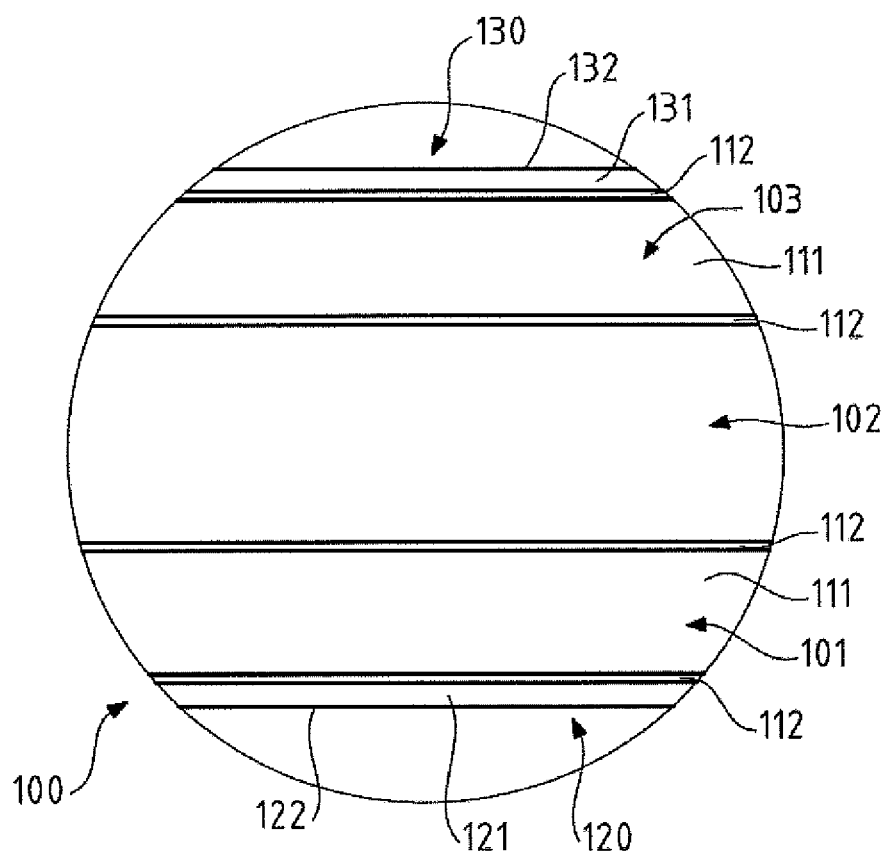
[Fig 9]
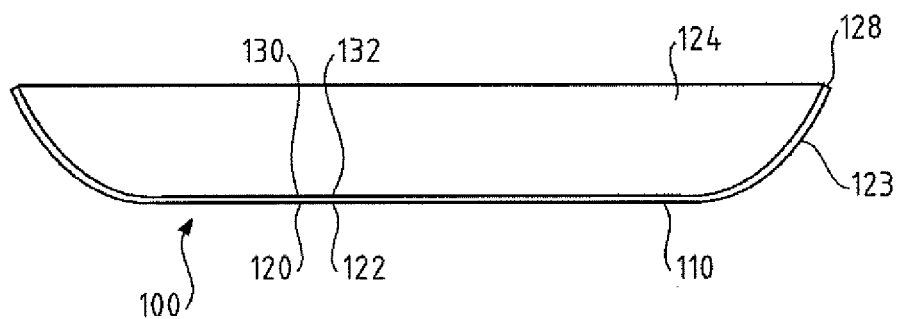

[Fig 10]
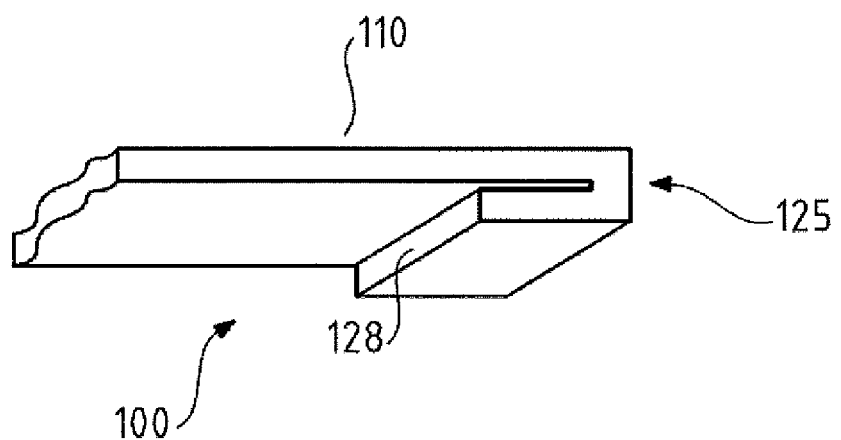
[Fig 11]
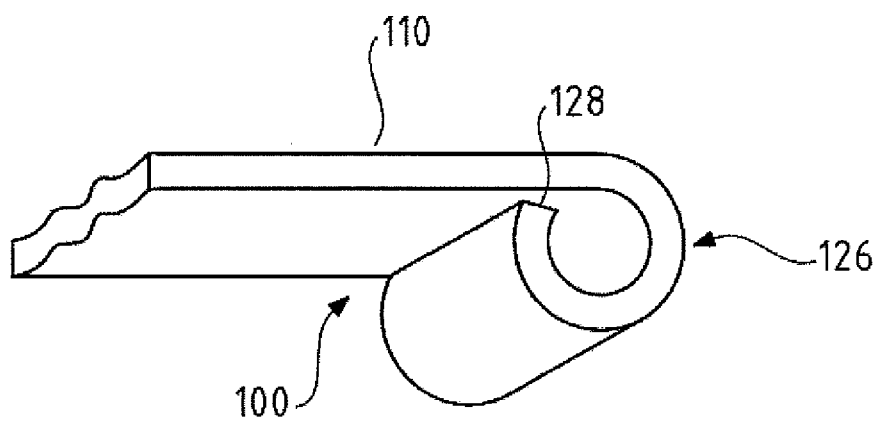

[Fig 12]
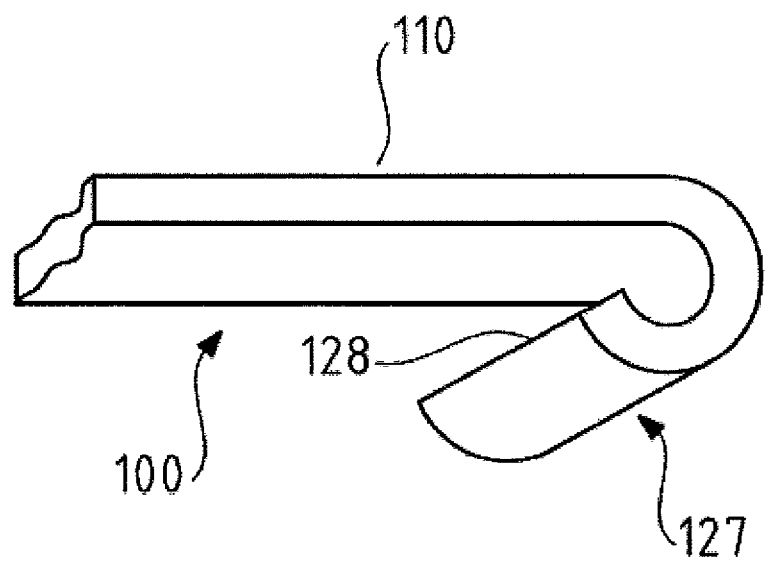
[Fig 13]
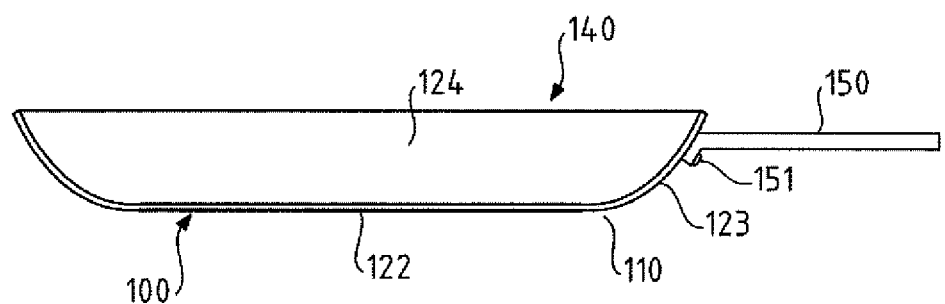
[Fig 14]
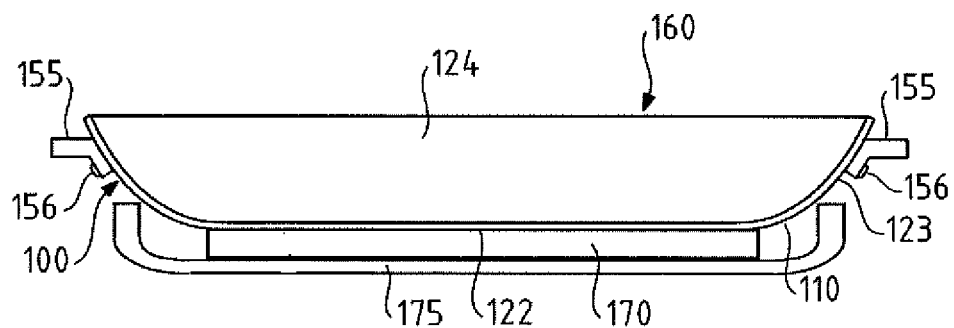

COATED MULTILAYER METAL COOKING VESSEL THAT CAN BE HEATED BY INDUCTION

CROSS-REFERENCE TO RELATED APPLICATIONS

The present application is a national phase entry under 35 U.S.C § 371 of International Application No. PCT/EP2020/087713 filed Dec. 22, 2020, which claims priority from French Application No. 1915687 filed Dec. 27, 2019, all of which are hereby incorporated herein by reference.

The present invention concerns the technical field of metal cooking vessels compatible with induction heating, for cooking or heating food. Such metal cooking vessels can be used with an induction heating device such as an induction hob installed or integrated into a worktop, or an induction heater integrated into an electric cooking appliance.

The present invention relates more particularly to coated multilayer metal cooking vessels compatible with induction heating.

The present invention relates particularly, but not exclusively, to coated multilayer metal cooking racks forming a cooking vessel.

The present invention also relates to cookware comprising a coated multilayer metal cooking vessel associated with at least one gripping element. If desired, the gripping element(s) can be removed or disassembled from the coated multilayer metal cooking vessel.

The present invention also relates to electric cooking appliances having a coated multilayer metal cooking vessel associated with an induction heater.

It is known from EP2554080 to make a coated cookware article compatible with induction heating, wherein a metal plate forming a cooking surface is joined with a ferritic stainless-steel plate using an interleaved aluminum plate to obtain a metallurgical joining of the different plates.

A disadvantage of this type of design is that such a coated metal cooking vessel has a relatively high-cost price, due in particular to the presence of a stamping operation to obtain a metallurgical assembly of the various plates.

Another disadvantage of this design is that such a coated metal cooking vessel is relatively heavy, due to the presence of the interleaved aluminum plate and the ferritic stainless-steel plate.

Various aspects of the present invention are intended to overcome the disadvantages of the prior art by providing a coated multilayer metal cooking vessel that is compatible with induction heating and has a limited cost.

A first aspect of the present invention relates to a coated multilayer metal cooking vessel compatible with induction heating, comprising a metal body including a heating face and a cooking face, the heating face having a bottom configured to rest on an induction heating device, the heating face carrying a protective coating, the cooking face carrying a non-stick coating forming a cooking surface in that the metal body is made of a metallurgically assembled aluminum sheet with a double-sided aluminized low-carbon ferromagnetic steel sheet forming the heating face, and if desired with another double-sided aluminized low-carbon ferromagnetic steel sheet, that the double-sided aluminized low-carbon ferromagnetic steel sheet is made of a low-carbon ferromagnetic steel substrate with, on each of its two faces, an outer layer comprising an aluminum-based matrix, that an intermediate layer comprising iron/aluminum intermetallic compounds is arranged between the ferromagnetic low-carbon steel substrate and the outer layer, and that at least on the bottom of the heating face, the outer layer has a thickness of less than 27 µm, preferably less than 20 µm, and even more preferably less than 18 µm. The low-carbon steel used for the ferromagnetic substrate is sensitive to magnetic fields and can be heated by induction. Aluminum, on the other hand, is a disturbing material for the magnetic field used for induction heating. However, during the aluminization of a steel sheet, an intermetallic reaction layer is formed at the interface between the steel and the aluminum. The intermetallic compounds of the intermediate layer do not have the disruptive character of aluminum for the magnetic field used for induction heating. Thus, in the aluminum-based coating used for aluminization, the thickness of the outer layer comprising an aluminum-based matrix appears to be the main relevant parameter for obtaining compatibility with induction plates. The use of such a coated metal body provides a coated multilayer metal cooking vessel that is compatible with induction heating and is more economical to produce than a coated metal cooking vessel comprising an aluminum body combined with a ferromagnetic steel element. The use of such a coated metal body provides a coated multilayer metal cooking vessel compatible with induction heating that is lighter than a coated metal cooking vessel made from cast steel. The aluminum sheet helps to limit hot spots, and therefore, the risk of overheating the non-stick coating forming the cooking surface.

The outer layer may comprise Al—Fe—Si needles in an aluminum-silicon matrix. The use of an aluminizing bath containing aluminum and silicon facilitates the production of the outer layer during the aluminization of the steel sheet. Silicon does not have the disruptive character of aluminum for the magnetic field used for induction heating.

The low-carbon steel ferromagnetic substrate can have a thickness of between 0.3 and 1 mm, and preferably a thickness of between 0.3 and 0.5 mm, and the aluminum sheet can have a thickness of between 0.3 and 3 mm, and preferably a thickness of between 0.5 and 1.5 mm.

The low-carbon ferromagnetic steel substrate can be made of a steel grade with at most 0.3 wt. % carbon, and preferably between 0.1 and 0.2 wt. % carbon.

The protective coating can be applied directly to the heating surface of the metal body. The protective coating may consist of one or more layers.

The non-stick coating can be applied directly to the cooking face of the metal body. The non-stick coating may have one or more layers. If desired, an intermediate coating can be arranged between the non-stick coating and the metal body, to obtain a hard base.

In particular, the protective coating can be a PTFE type coating, or an enamel type coating, or a lacquer type coating, or a ceramic type coating, or a sol-gel type coating.

According to an embodiment, the protective coating can be a PTFE type coating, or a lacquer type coating, or a ceramic type coating, or a sol-gel type coating, the metal body comprising an aluminum-based deposit having at least on the bottom of the heating face a thickness of less than 30 µm, and preferably a thickness less than 20 µm.

According to another embodiment, the protective coating can be an enamel type coating, the metal body comprising an aluminum-based deposit having at least on the bottom of the heating face a thickness of less than 40 µm, and preferably a thickness of less than 30 µm.

The non-stick coating can be a PTFE type coating, or a ceramic type coating, or a sol-gel type coating.

The coated multilayer metal cooking rack can have a side wall rising around the bottom of the heating face to form a cooking vessel.

In particular, the coated multilayer metal cooking vessel can have a pinched edge or a rolled edge or an open rolled edge. This arrangement avoids leaving the edge of the metal body visible.

A second aspect of the present invention relates to a cookware article comprising a coated multilayer metal cooking vessel and a gripping element mounted on the coated multilayer metal cooking vessel, because the coated multilayer metal cooking vessel conforms to at least one of the foregoing features.

A third aspect of the present invention relates to an electric cooking appliance with a coated multilayer metal cooking vessel associated with an induction heater, in that the coated multilayer metal cooking vessel conforms to at least one of the foregoing features.

A fourth aspect of the present invention relates to a method of obtaining a coated multilayer metal cooking vessel compatible with induction heating according to at least one of the above features, comprising the following steps:
 Cutting or supplying a multilayer shape from a double-sided aluminized low-carbon ferromagnetic steel sheet metallurgically assembled with an aluminum sheet, the double-sided aluminized low-carbon ferromagnetic steel sheet having a first free face, the aluminum sheet having a second free face,
 Stamping of the multilayer shape to form the metal body comprising the heating face corresponding to the first free face and the cooking face corresponding to the second free face,
 Making the protective coating on the heating face,
 Making the non-stick coating on the cooking face to form the cooking surface.

A fifth aspect of the present invention relates to a method of obtaining a coated multilayer metal cooking vessel compatible with induction heating according to at least one of the above features, comprising the following steps:
 Cutting or supplying a multilayer shape from an aluminum sheet metallurgically assembled with a double-sided aluminized low-carbon ferromagnetic steel sheet and with another double-sided aluminized low-carbon ferromagnetic steel sheet, the double-sided aluminized low-carbon ferromagnetic steel sheet having a first free face, the other double-sided aluminized low-carbon ferromagnetic steel sheet having a second free face,
 Stamping of the multilayer shape to form the metal body comprising the heating face corresponding to the first free face and the cooking face corresponding to the second free face,
 Making the protective coating on the heating face,
 Making the non-stick coating on the cooking face to form the cooking surface.

According to either one of these aspects, after drawing the form and before the multilayer protective and non-stick coatings are applied, the method may include a step of treating a peripheral portion of the multilayer form to obtain a pinched edge or a rolled edge or an open rolled edge.

In particular, the protective coating can be a PTFE type coating, or an enamel type coating, or a lacquer type coating, or a ceramic type coating, or a sol-gel type coating.

In particular, the non-stick coating can be a PTFE type coating, or a ceramic type coating, or a sol-gel type coating.

A sixth aspect of the present invention relates to a method of obtaining a coated multilayer metal cooking vessel compatible with induction heating according to at least one of the above features, comprising the following steps:
 Cutting or supplying a multilayer shape from an aluminum sheet metallurgically assembled with a double-sided aluminized low-carbon ferromagnetic steel sheet and with another double-sided aluminized low-carbon ferromagnetic steel sheet, the double-sided aluminized low-carbon ferromagnetic steel sheet having a first free face, the other double-sided aluminized low-carbon ferromagnetic steel sheet having a second free face,
 Protective coating on the first free face and non-stick coating on the second free face to obtain a coated multilayer shape.
 Stamping the coated multilayer shape to form the coated metal body comprising the heating face with the protective coating and the cooking face with the non-stick coating to form the cooking surface.

After the protective coating and the non-stick coating have been applied, and after the coated multilayer shape has been drawn, the method may include a step of treating a peripheral portion of the coated multilayer shape to obtain a pinched edge or a rolled edge or an open rolled edge.

In particular, the protective coating can be a PTFE type coating or a lacquer type coating.

The non-stick coating can be a PTFE type coating.

According to one embodiment, the multilayer shape may be a disk. However, other shapes are possible.

Other features and attributes of the present invention will become more apparent from the following detailed description of exemplary embodiments and variants, taken by way of non-limitation, illustrated in the appended figures, wherein:

FIG. 1 shows a partial schematic view of an example of a metal body being used to make a coated metal cooking vessel, FIG. 2 shows an enlarged schematic sectional view of the metal body shown in FIG. 1, FIG. 3 shows an enlarged sectional view of a superficial part of the metal body shown in FIG. 2, FIG. 4 shows an enlarged schematic cross-sectional view of the metal body shown in FIG. 1, after a protective coating and a non-stick coating have been applied, FIG. 5 shows a partial schematic view of an example of a metal body being used to make a coated multilayer metal cooking vessel according to the invention, FIG. 6 shows a schematic cross-sectional view of the metal body shown in FIG. 5, after a protective coating and a non-stick coating have been applied, FIG. 7 shows a partial schematic view of another example of a metal body being used to make a coated multilayer metal cooking vessel according to the invention, FIG. 8 shows a schematic cross-sectional view of the metal body shown in FIG. 7, after a protective coating and a non-stick coating have been applied, FIG. 9 shows a schematic cross-sectional view of an example of an embodiment of a coated multilayer metal cooking vessel according to the invention comprising the metal body shown in FIG. 6 or in FIG. 8, FIG. 10 shows a schematic cross-sectional view of a first embodiment of a peripheral portion of a coated multilayer metal cooking vessel according to the invention, having a pinched edge, FIG. 11 shows a schematic cross-sectional view of a second embodiment of a peripheral portion of a coated multilayer metal cooking vessel according to the invention, having a rolled edge, FIG. 12 shows a schematic cross-sectional view of a third embodiment of a peripheral portion of a coated multilayer metal cooking vessel according to the invention, having an open rolled edge, FIG. 13 shows a schematic elevation and vertical cross-sectional view of an example embodiment of a cookware article having a coated multilayer metal cooking vessel according to the invention, FIG. 14 shows a schematic elevation and vertical cross-sectional view of an example embodiment of an electric cooking appliance having a coated multilayer metal cooking vessel according to the invention.

FIG. 1 illustrates an example embodiment of a metal body 110 used to make a coated metal cooking vessel compatible with induction heating.

The metal body 110 is made of double-sided aluminized low-carbon ferromagnetic steel sheet 101. The double-sided aluminization of a low-carbon ferromagnetic steel sheet is achieved by immersion in an aluminum-based aluminizing bath to achieve an aluminum-based deposit 115. The aluminum-based bath may include silicon, in particular between 8 and 13 wt. % silicon, to facilitate deposition on the steel. In particular, an AS-type aluminum-silicon alloy can be used, for example an AS alloy with between 8 and 13% silicon by weight. However, the use of an aluminizing bath with lower proportions of silicon, or an aluminizing bath without silicon, can be considered. The amount of material deposited on the steel sheet can be evaluated by weighing. The additional mass thus obtained makes it possible to define a thickness for the aluminum-based deposit 115 on the steel sheet. Usually, such an aluminum-based deposit 115 can reach several tens of μm.

As shown in FIG. 2, the double-sided aluminized low-carbon ferromagnetic steel sheet 101 used to make the coated metal induction heating-compatible cooking vessel comprises a low-carbon ferromagnetic steel substrate 111 having an aluminum-based outer layer 112 on each of its two sides.

The low-carbon ferromagnetic steel substrate 111 may have a thickness of between 0.7 and 3 mm, particularly a thickness of between 1 and 2 mm. The material of the low-carbon ferromagnetic steel substrate 111 is chosen to be compatible with induction heating. The low-carbon ferromagnetic steel substrate 111 may be made of a steel grade having at most 0.3 wt. % carbon, and preferably between 0.1 and 0.2 wt. % carbon. The ferromagnetic substrate made of low-carbon steel 111 can in particular be made of a grade DX51 to DX56 comprising between 0.12% and 0.18 wt. % carbon and up to 0.5 wt. % silicon.

As best seen in FIG. 3, an intermediate layer 113 is arranged between the low-carbon ferromagnetic steel substrate 111 and the outer layer 112. The intermediate layer 113 is an intermetallic reaction layer comprising iron/aluminum intermetallic compounds, in particular $FeAl_3$ and $Fe_2Al_5$. Thus, all of the aluminum-based deposit 115 made on the sheet steel is not found in the outer layer 112. A portion of the aluminum-based deposit 115 is in the intermediate layer 113.

The thickness of this intermediate layer 113 is usually between 3 and 5 μm. However, heat treatments above 500° C. can contribute to increase the thickness of this intermediate layer 113 to the detriment of the thickness of the outer layer 112, this intermediate layer 113 can then be subdivided into several sub-layers having different aluminum/iron ratios, these ratios increasing from the ferromagnetic substrate made of low-carbon steel 111 towards the outer layer 112.

The aluminum-based outer layer 112 may include silicon, when the aluminizing bath includes silicon, particularly between 8 and 13 wt. % silicon. The outer layer 112 may then include Al—Fe—Si needles 114 in an aluminum-silicon matrix 116, as seen in the embodiment example shown in FIG. 4.

FIGS. 5 and 6 illustrate two example embodiments of a metal body 110 used to make a coated multilayer metal cooking vessel 100 compatible with induction heating, shown in FIG. 9.

The metal body 110 shown in FIG. 5 differs from the metal body 110 shown in FIG. 1 in that it comprises an aluminum sheet 102 metallurgically assembled with the double-sided aluminized low-carbon ferromagnetic steel sheet 101. The aluminum sheet 102 is made of wrought aluminum alloy. The plating of the metallurgically assembled aluminum sheet 102 with the double-sided aluminized low-carbon ferromagnetic steel sheet 101 can, for example, be performed by rolling or diffusion. The thickness of the double-sided aluminized low-carbon ferromagnetic steel sheet 101 is, for example, 0.3 to 1 mm, and preferably between 0.3 and 0.5 mm. The thickness of the aluminum sheet 102 is, for example, 0.3 to 3 mm, and preferably between 0.5 and 1.5 mm.

The metal body 110 shown in FIG. 6 differs from the metal body 110 shown in FIG. 5 in that it comprises another double-sided aluminized low-carbon ferromagnetic steel sheet 103 metallurgically assembled with the aluminum sheet 102. The plating of the metallurgically assembled aluminum sheet 102 with the double-sided aluminized low-carbon ferromagnetic steel sheet 101 and with the double-sided aluminized low-carbon ferromagnetic steel sheet 103 can, for example, be performed by rolling or diffusion. The thickness of the double-sided aluminized low-carbon ferromagnetic steel sheet 101 is, for example, 0.3 to 1 mm, and preferably between 0.3 and 0.5 mm. The thickness of the aluminum sheet 102 is, for example, 0.3 to 3 mm, and preferably between 0.5 and 1.5 mm. The thickness of the other double-sided aluminized low-carbon ferromagnetic steel sheet 103 is, for example, 0.3 to 1 mm, and preferably between 0.3 and 0.5 mm.

As shown in FIG. 9, the metal body 110 includes a heating face 120 and a cooking face 130. The heating face 120 has a bottom 122 configured to rest on an induction heating device, including an induction plate or induction heater.

As shown in FIG. 9, the heating face 120 bears a protective coating 121; the cooking face 130 bears a non-stick coating 131 forming a cooking surface 132.

The coated multilayer metal cooking vessel 100 compatible with induction heating according to the invention shown in FIG. 6 or in FIG. 8 includes metal body 110, protective coating 121, and non-stick coating 131. The metal body 110 has the protective coating 121 and the non-stick coating 131.

In the embodiment of FIG. 1 as in the embodiment examples of FIG. 5 and FIG. 6, the heating face 120 is formed by the double-sided aluminized low-carbon ferromagnetic steel sheet 101.

In the embodiment example of FIG. 6, the cooking face 130 is formed by the aluminum sheet 102. The thickness of the aluminum sheet 102 is, for example, 1.2 mm, the thickness of the double-sided aluminized low-carbon ferromagnetic steel sheet 101 being, for example, in the order of 0.3 mm.

In the embodiment example of FIG. 8, the cooking face 130 is formed by the other double-sided aluminized low-carbon ferromagnetic steel sheet 103. The thickness of the aluminum sheet 102 is, for example, 1.2 mm, the thickness of the double-sided aluminized low-carbon ferromagnetic steel sheet 101 and the other double-sided aluminized low-carbon ferromagnetic steel sheet 103 being, for example, in the order of 0.3 mm.

If desired, the protective coating 121 can be applied directly to the heating surface 120 of the metal body 110, in particular to the outer layer 112 on the bottom side 122. If necessary, a surface preparation can be carried out on the heating surface 120 before the protective coating 121 is made. In particular, the protective coating 121 may be a PTFE type coating, or an enamel type coating, or a lacquer type coating, or a ceramic type coating, or a sol-gel type coating.

If desired, the non-stick coating 131 can be applied directly to the cooking face 130 of the metal body 110. If necessary, a surface preparation can be carried out on the cooking side 130 before the protective coating 121 is made. In particular, the non-stick coating 131 may be a PTFE type coating, or a ceramic type coating, or a sol-gel type coating.

As shown in FIG. 9, the coated multilayer metal cooking vessel 100 may include a side wall 123 rising around the bottom 122 of the heating face 120 to form a cooking vessel 124. Alternatively, the coated multilayer metal cooking rack 100 does not necessarily form a cooking vessel 124. In particular, the coated multilayer metal cooking surface 100 can form a cooking plate.

Tests with several induction plates have shown that the relevant parameter for achieving compatibility with induction heating on different induction heating devices is the thickness of the outer layer 112 on the bottom 122 of the heating face 120, not the thickness of the aluminum-based deposit 115 on the bottom 122 of the heating face 120. The induction plates used are described in Table 1.

TABLE 1

|  | MIELE ® | THOR ® | BRANDT ® |
|---|---|---|---|
| Ref | KM5946 | TTI63R | TI312 BT1 |
| Power | 3000 W | 2300 W | 2000 W |
| Ø inducer | 260 mm | 220 mm | 210 mm |

Indeed, these tests have shown that the limit value of the thickness of the aluminum-based deposit 115 on the bottom 122 of the heating face 120 to obtain a coupling on an induction plate is of the order of 30 μm when the protective coating 121 is a PTFE type coating, or a lacquer type coating or a ceramic type coating, or a sol-gel type coating, but that the limit value of the thickness of the aluminum-based deposit 115 on the bottom 122 of the heating face 120 to obtain coupling on an induction plate is of the order of 40 μm when the protective coating 121 is an enamel type coating. These tests also showed that a satisfactory coupling was obtained with all the induction plates below a thickness of aluminum-based deposit 115 on the bottom 122 of the heating face 120 of the order of 20 μm, when the protective coating 121 is a PTFE type coating, or a lacquer type coating, or a ceramic type coating, or a sol-gel type coating; and below an aluminum-based deposit thickness 115 on the bottom 122 of the heating face 120 of the order of 30 μm, when the protective coating 121 is an enamel type coating. The use of an enamel type coating requires firing temperatures in the range of 550° C. to 600° C. Above 500° C., a diffusion phenomenon taking place at the steel/aluminum interface favors the formation of iron/aluminum intermetallic compounds, which displaces the interface between the intermediate layer 113 and the outer layer 112, and reduces the thickness of the outer layer 112.

The thickness of the intermediate layer 113 is of the order of 3 to 5 μm, but can be greater in particular in the case of heat treatment favoring the growth of the thickness of the intermediate layer 113, if necessary, in the form of several sub-layers, and/or the reduction of the thickness of the outer layer 112.

The thickness of the outer layer 112 on the bottom 122 of the heating face 120 is critical to the compatibility of the coated multilayer metal cooking vessel 100 with induction heating. A thickness of less than 27 μm for the outer layer 112 on the bottom 122 of the heating face 120 is considered a limiting value for achieving coupling on an induction plate. For the outer layer 112 on the bottom 122 of the heating face 120, a thickness of less than 26 μm gives a better result than a thickness of less than 27 μm, a thickness of less than 25 μm gives a better result than a thickness of less than 26 μm, a thickness of less than 24 μm gives a better result than a thickness of less than 25 μm, a thickness of less than 23 μm gives a better result than a thickness of less than 24 μm, a thickness of less than 22 μm gives a better result than a thickness of less than 23 μm, a thickness of less than 21 μm gives a better result than a thickness of less than 22 μm, a thickness of less than 20 μm gives a better result than a thickness of less than 21 μm, a thickness of less than 19 μm gives a better result than a thickness of less than 20 μm, a thickness of less than 18 μm gives a better result than a thickness of less than 19 μm, a thickness of less than 17 μm gives a better result than a thickness of less than 18 μm. A thickness of less than 20 μm for the outer layer 112 on the bottom 122 of the heating face 120 allows for a fairly satisfactory coupling with induction plates. A thickness of less than 18 μm for the outer layer 112 on the bottom 122 of the heating face 120 allows for a very satisfactory coupling with the induction plates. The efficiency (power absorbed by the coated multilayer metal cooking vessel 100/power emitted by the induction plate) can approach 100%. The heating speed is very fast.

As shown in FIG. 9, the coated multilayer metal cooking vessel 100 compatible with induction heating has an exposed edge 128. The edge 128 is generally devoid of an outer layer 112 due to the cutting of the metal body 110 to make a multilayer shape suitable for making the coated multilayer metal cooking vessel 100. The edge 128 may be at least partially covered by the protective coating 121 and/or non-stick coating 131. Preferably, the exposed edge 128 is covered by the protective coating 121 and/or by the non-stick coating 131.

As shown in FIG. 10, the coated multilayer metal cooking vessel 100 compatible with induction heating may have a pinched edge 125. As shown in FIG. 11, the coated multilayer metal cooking vessel 100 compatible with induction heating may have a rolled edge 126. As shown in FIG. 12, the coated multilayer metal cooking vessel 100 compatible with induction heating may have an open rolled edge 127. Thus, the edge 128 does not appear on the top side of the coated multilayer metal cooking vessel 100.

FIG. 13 illustrates a cookware article 140 having the coated multilayer metal cooking vessel 100 and a gripping element 150 mounted on the coated multilayer metal cooking vessel 100. The coated multilayer metal cooking vessel 100 forms the cooking vessel 124 shown in FIG. 9. In the example embodiment shown in FIG. 9, the gripping element 150 is attached to the cooking vessel 124 by at least one rivet 151. For this purpose, the rivet 151 is mounted in a hole in the side wall 123. If desired, multiple rivets 151 may be used to secure the gripping element 150 to the cooking vessel 124. Preferably, between two and four rivets 151 are used to secure the gripping element 150 to the cooking vessel 124. Alternatively, the gripping element 150 could be attached to the side wall 123 by welding or screwing to a stud welded to the side wall 123. If desired, a further gripping element can be attached to the side wall 123 of the cooking vessel 124 by means of at least one further rivet, by welding or by screwing onto a stud welded to the side wall 123

FIG. 14 illustrates an electric cooking appliance 160 having the coated multilayer metal cooking vessel 100 associated with an induction heater 170. The coated multilayer metal cooking vessel 100 forms the cooking vessel 124 shown in FIG. 9. The cooking vessel 124 is arranged in a heating base 175 comprising the induction heater 170. The bottom 122 rests on the induction heater 170. If desired, the cooking vessel 124 may include at least one gripping element 155. In the example embodiment shown in FIG. 14, the cooking vessel 124 has two opposing gripping elements 155. One or each gripping element 155 is attached to the cooking vessel 124 by at least one rivet 156. For this purpose, the rivet 156 is mounted in a hole in the side wall 123. If desired, multiple rivets 156 may be used to secure the or each gripping element 155 to the cooking vessel 124. Preferably, between two and four rivets 156 are used to secure the or each gripping element 155 to the cooking vessel 124. Alternatively, one or at least one of the gripping element 155 could be attached to the side wall 123 by welding or screwing to a stud welded to the side wall 123.

The coated multilayer metal cooking vessel 100 compatible with induction heating according to the invention can be obtained by various methods.

A first method of obtaining a coated multilayer metal cooking vessel 100 compatible with induction heating includes the following steps:

Cutting or supplying a multilayer shape from a double-sided aluminized low-carbon ferromagnetic steel sheet 101 metallurgically assembled with an aluminum sheet 102, the double-sided aluminized low-carbon ferromagnetic steel sheet 101 having a first free face, the aluminum sheet 102 having a second free face, Stamping of the multilayer shape to form the metal body 110 comprising the heating face 120 corresponding to the first free face and the cooking face 130 corresponding to the second free face, Production of the protective coating 121 on the heating face 120, The non-stick coating 131 is applied to the cooking face 130 to form the cooking surface 132.

A second method of obtaining a coated multilayer metal cooking vessel 100 compatible with induction heating comprises the following steps:

Cutting or supplying a multilayer shape from an aluminum sheet 102 metallurgically assembled with a double-sided aluminized low-carbon ferromagnetic steel sheet 101 and with another double-sided aluminized low-carbon ferromagnetic steel sheet 103, the double-sided aluminized low-carbon ferromagnetic steel sheet 101 having a first free face, the other double-sided aluminized low-carbon ferromagnetic steel sheet 103 having a second free face, Stamping of the multilayer shape to form the metal body 110 comprising the heating face 120 corresponding to the first free face and the cooking face 130 corresponding to the second free face, Production of the protective coating 121 on the heating face 120, The non-stick coating 131 is applied to the cooking face 130 to form the cooking surface 132.

In particular, the multilayer shape can be a disk. If desired after drawing the multilayer shape and before making the protective coating 121 and the non-stick coating 131, the first method or the second method may include a step of treating a peripheral portion of the multilayer shape to obtain a pinched edge 125 or a rolled edge 126 or an open rolled edge 127.

In this first method or in this second method, the protective coating 121 and the non-stick coating 131 are made after the shaping operation. The range of coatings that can be used is wide. In particular, the protective coating 121 may be a PTFE type coating, or an enamel type coating, or a lacquer type coating, or a ceramic type coating, or a sol-gel type coating. In particular, the non-stick coating 131 may be a PTFE type coating, or a ceramic type coating, or a sol-gel type coating.

A third method of obtaining a coated multilayer metal cooking vessel 100 compatible with induction heating comprises the following steps:

Cutting or supplying a multilayer shape from an aluminum sheet metallurgically assembled with a double-sided aluminized low-carbon ferromagnetic steel sheet 101 and with another double-sided aluminized low-carbon ferromagnetic steel sheet 103, the double-sided aluminized low-carbon ferromagnetic steel sheet 101 having a first free face, the other double-sided aluminized low-carbon ferromagnetic steel sheet 103 having a second free face, Protective coating 121 on the first free face and non-stick coating 131 on the second free face to obtain a coated multilayer shape, Stamping the coated multilayer shape to form the coated metal body 110 comprising the heating face 120 bearing the protective coating 121 and the cooking face 130 bearing the non-stick coating 131 to form the cooking surface 132.

In particular, the multilayer shape can be a disk. If desired, after the protective coating 121 and the non-stick coating 131 have been applied, and after the coated multilayer shape has been drawn, the third method may include a step of treating a peripheral portion of the shape to obtain a pinched edge 125 or a rolled edge 126 or an open rolled edge 127.

In this third method, the protective coating 121 and the non-stick coating 131 are performed prior to the shaping operation. As a result, the range of coatings that can be used is more limited.

The protective coating 121 and the non-stick coating 131 shall allow the shape to be formed by stamping the shape. In particular, the protective coating 121 can be a PTFE type coating or a lacquer type coating. In particular, the non-stick coating 131 may be a PTFE type coating.

The use of a metal body 110 consisting on one of its faces of a double-sided aluminized low-carbon ferromagnetic steel sheet 101 to make the coated multilayer metal cooking vessel 100 allows conventional manufacturing processes to be used, limiting the investment required.

The coated multilayer metal cooking vessel 100 is very strong mechanically. The efficiency (power input/power output of the induction heater) is very high, especially if the thickness of the aluminum-based deposit 115 is less than 20 µm. The heating speed is high: approximately 15 seconds for a 28 cm diameter pan against about 1 min 30 for a standard aluminum pan of the same diameter with a stainless-steel insert for compatibility with induction heating. Energy savings can be achieved, as the power supplied by the induction heater may be lower.

With a two-layer construction according to the embodiment example of FIG. 6 or three-layer construction according to the embodiment example of FIG. 8, the presence of an aluminum sheet 102 metallurgically assembled with the double-sided aluminized low-carbon ferromagnetic steel sheet 101 makes it possible to improve the thermal homogeneity of the cooking surface 132.

With a two-layer construction according to the embodiment example of FIG. 6, the coated multilayer metal cooking vessel 100 remains fairly light while providing better thermal homogeneity.

With a three-layer construction according to the embodiment example of FIG. 8, the presence of another double-sided aluminized low-carbon ferromagnetic steel sheet 103 metallurgically assembled with the aluminum sheet 102 makes it possible to use a method in which shaping is performed after the coating operations. The coated multilayer metal cooking vessel 100 remains relatively light.

Various modifications and/or improvements that are obvious for the person skilled in the art can be made to the exemplary embodiments of the invention described in this description without departing from the scope of the invention defined by the appended claims.

The invention claimed is:

1. A coated multilayer metal cooking support compatible with induction heating, comprising a metal body including a heating face and a cooking face, the heating face having a bottom configured to face an induction heating device, the heating face having a protective coating, the cooking face having a non-stick coating forming a cooking surface, wherein the metal body includes an aluminum sheet and a first double-sided aluminized low-carbon ferromagnetic steel sheet forming the heating face, wherein the first double-sided aluminized low-carbon ferromagnetic steel sheet is made of a low-carbon ferromagnetic steel substrate having on each of its two faces an outer layer including an intermediate layer, the outer layer comprising an aluminum-based matrix, the intermediate layer comprising iron/aluminum intermetallic compounds positioned between the low-carbon ferromagnetic steel substrate and the outer layer, and at least on the bottom of the heating face, the outer layer has a thickness of less than 27 μm and comprises silicon in an amount of more than 10 wt % to less than or equal to 13 wt %, based on a total weight of the outer layer, wherein the outer layer comprises Al—Fe—Si needles in an aluminum-silicon matrix.

2. A coated multilayer metal cooking support compatible with induction heating according to claim 1, wherein the low-carbon ferromagnetic steel substrate has a thickness between 0.3 and 1 mm, and wherein the aluminum sheet has a thickness between 0.3 and 3 mm.

3. A coated multilayer metal cooking support compatible with induction heating according to claim 1, wherein the low-carbon ferromagnetic steel substrate is made of a steel grade having at most 0.3 wt. % carbon.

4. A coated multilayer metal cooking support compatible with induction heating according to claim 1, wherein the protective coating is made directly on the heating face of the metal body.

5. A coated multilayer metal cooking support compatible with induction heating according to claim 1, wherein the protective coating is a PTFE type coating, an enamel type coating, a lacquer type coating, a ceramic type coating, or a sol-gel type coating.

6. A coated multilayer metal cooking support compatible with induction heating according to claim 5, wherein the protective coating is a PTFE type coating, a lacquer type coating, a ceramic type coating, or a sol-gel type coating, and the outer and intermediate layers of the metal body together define an aluminum-based deposit having, at least on the bottom of the heating face, a thickness of less than 30 μm.

7. A coated multilayer metal cooking support compatible with induction heating according to claim 5, wherein the protective coating is an enamel type coating, and wherein the outer and intermediate layers of the metal body together define an aluminum-based deposit having, at least on the bottom of the heating face, a thickness of less than 40 μm.

8. A coated multilayer metal cooking support compatible with induction heating according to claim 1, wherein the non-stick coating is a PTFE type coating, a ceramic type coating, or a sol-gel type coating.

9. A coated multilayer metal cooking support compatible with induction heating according to claim 1, wherein a side wall rises from the bottom of the heating face to form a cooking vessel.

10. A coated multilayer metal cooking support compatible with induction heating according to claim 1, wherein the cooking support has a pinched edge, a rolled edge, or an open rolled edge.

11. A cookware article comprising a coated multilayer metal cooking support and a gripping element coupled to the coated multilayer metal cooking support according to claim 1.

12. An electric cooking appliance comprising the coated multilayer metal cooking support according to claim 1.

13. A method of obtaining a coated multilayer metal cooking support compatible with induction heating according to claim 1, comprising the following steps:
cutting or supplying a multilayer shape from a double-sided aluminized low-carbon ferromagnetic steel sheet metallurgically assembled with an aluminum sheet, the double-sided aluminized low-carbon ferromagnetic steel sheet having a first free face and the aluminum sheet having a second free face,
stamping the multilayer shape to form the metal body comprising the heating face corresponding to the first free face and the cooking face corresponding to the second free face,
forming the protective coating on the heating face,
applying the non-stick coating to the cooking face to form a cooking surface.

14. A method of obtaining a coated multilayer metal cooking support compatible with induction heating according to claim 1, comprising the following steps:
cutting or supplying a multilayer shape from an aluminum sheet metallurgically assembled with a first double-sided aluminized low-carbon ferromagnetic steel sheet and a second double-sided aluminized low-carbon ferromagnetic steel sheet, the first double-sided aluminized low-carbon ferromagnetic steel sheet having a first free face, the second double-sided aluminized low-carbon ferromagnetic steel sheet having a second free face,
stamping the multilayer shape to form a metal body comprising a heating face corresponding to the first free face and a cooking face corresponding to the second free face,
forming a protective coating on the heating face,
applying a non-stick coating to the cooking face to form a cooking surface.

15. A method for obtaining a coated multilayer metal cooking support compatible with induction heating according to claim 13, wherein after the stamping of the multilayer shape and before forming the protective coating and applying the non-stick coating, the method comprises a step of treating a peripheral part of the multilayer shape in order to obtain a pinched edge, a rolled edge, or an open rolled edge.

16. A method of obtaining a coated multilayer metal cooking support compatible with induction heating according to claim 13, wherein the protective coating is a PTFE type coating, an enamel type coating, a lacquer type coating, a ceramic type coating, or a sol-gel type coating.

17. A method of obtaining a coated multilayer metal cooking support compatible with induction heating according to claim 13, wherein the non-stick coating is a PTFE type coating, a ceramic type coating, or a sol-gel type coating.

18. A method of obtaining a coated multilayer metal cooking support compatible with induction heating according to claim 1, comprising the following steps:
   cutting or supplying a multilayer shape from an aluminum sheet metallurgically assembled with a first double-sided aluminized low-carbon ferromagnetic steel sheet and a second double-sided aluminized low-carbon ferromagnetic steel sheet, the first double-sided aluminized low-carbon ferromagnetic steel sheet having a first free face, the second double-sided aluminized low-carbon ferromagnetic steel sheet having a second free face,
   forming a protective coating on the first free face and non-stick coating on the second free face to obtain a coated multilayer shape,
   stamping the coated multilayer shape to form a coated metal body comprising a heating face bearing the protective coating and a cooking face bearing the non-stick coating to form a cooking surface.

19. A method of obtaining a coated multilayer metal cooking support compatible with induction heating according to claim 18, wherein after the protective coating and the non-stick coating have been formed, and after the coated multilayer shape has been stamped, the method comprises a step of treating a peripheral part of the coated multilayer shape in order to obtain a pinched edge, a rolled edge, or an open rolled edge.

20. A method of obtaining a coated multilayer metal cooking support compatible with induction heating according to claim 18, wherein the protective coating is a PTFE type coating or a lacquer type coating.

21. A method of obtaining a coated multilayer metal cooking support compatible with induction heating according to claim 18, wherein the non-stick coating is a PTFE type coating.

22. A method of obtaining a coated multilayer metal cooking support compatible with induction heating according to claim 13, wherein the multilayer shape is a disk.

23. A coated multilayer metal cooking support compatible with induction heating according to claim 1, wherein the outer layer has a thickness of less than 20 μm.

24. A coated multilayer metal cooking support compatible with induction heating according to claim 1, wherein the outer layer has a thickness of less than 18 μm.

25. A coated multilayer metal cooking support compatible with induction heating according to claim 1, wherein the metal body further includes a second double-sided aluminized low-carbon ferromagnetic steel sheet forming the cooking face.

\* \* \* \* \*